(12) United States Patent
Dawson

(10) Patent No.: US 8,417,948 B2
(45) Date of Patent: Apr. 9, 2013

(54) COMPUTER SCRIPTING ENGINE TO EXTRACT AND EXECUTE STEGANOGRAPHICALLY HIDDEN SCRIPTS IN CARRIER SCRIPTS

(75) Inventor: Thomas Dawson, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 952 days.

(21) Appl. No.: 11/610,474

(22) Filed: Dec. 13, 2006

(65) Prior Publication Data

US 2008/0148228 A1    Jun. 19, 2008

(51) Int. Cl.
*G06F 21/00*    (2006.01)

(52) U.S. Cl.
USPC ........................................................ 713/168

(58) Field of Classification Search .................. 713/161, 713/168; 726/2, 4, 17, 21
See application file for complete search history.

(56) References Cited

U.S. PATENT DOCUMENTS

| | | | | |
|---|---|---|---|---|
| 5,107,259 A | * | 4/1992 | Weitzen et al. | 340/7.56 |
| 5,931,905 A | * | 8/1999 | Hashimoto et al. | 709/217 |
| 6,834,343 B1 | | 12/2004 | Burns | |
| 7,339,513 B1 | * | 3/2008 | Provis et al. | 341/173 |
| 2004/0202324 A1 | | 10/2004 | Yamaguchi et al. | |
| 2005/0049970 A1 | | 3/2005 | Sato et al. | |
| 2005/0094565 A1 | * | 5/2005 | Brown et al. | 370/236.2 |
| 2005/0210526 A1 | * | 9/2005 | Levy et al. | 725/113 |
| 2005/0262347 A1 | | 11/2005 | Sato et al. | |
| 2006/0010430 A1 | | 1/2006 | Cousot et al. | |
| 2007/0274487 A1 | * | 11/2007 | Tsai | 379/201.01 |

FOREIGN PATENT DOCUMENTS

| | | |
|---|---|---|
| EP | 1674966 A1 | 6/2006 |
| WO | WO0068875 A1 | 11/2000 |

OTHER PUBLICATIONS

Collberg, C. and Thomborson, C., Software Watermarking: Models and Dynamic Embeddings, University of Auckland Department of Computer Science, Jan. 1999, Auckland, New Zealand.
Collberg, C., Thomborson, C. and Low, D., A Taxonomy of Obfuscating Transformations, University of Auckland Department of Computer Science, Technical Report #148, 2002, Auckland, New Zealand.
El-Khalil, R. and Keromytis, A.D., Hydan: Hiding Information in Program Binaries, Columbia University Department of Computer Science, 2004, New York, NY.
Kessler, G.C., An Overview of Steganography for the Computer Forensics Examiner, Champlain College Computer & Digital Forensics Program, Feb. 2004, Burlington, VT.
Heffner, K. and Collberg, C., The Obfuscation Executive, University of Arizona Department of Computer Science, Technical Report TR04-03, 2004, Tucson, AZ.

* cited by examiner

*Primary Examiner* — Brandon Hoffman
*Assistant Examiner* — Anthony Brown
(74) *Attorney, Agent, or Firm* — Blakely, Sokoloff, Taylor & Zafman LLP

(57) ABSTRACT

A scripting engine causes a computer to perform operations. The scripting engine includes a first script interpreter that executes a carrier script. A steganographic decoder extracts a hidden script that is steganographically coded in the carrier script. A second script interpreter executes the hidden script. The carrier script may include a graphic image file and the hidden script may be steganographically coded in the graphic image file. The scripting engine may further include a decryption module that decrypts the hidden script with a key that may be steganographically coded in a third script.

27 Claims, 3 Drawing Sheets

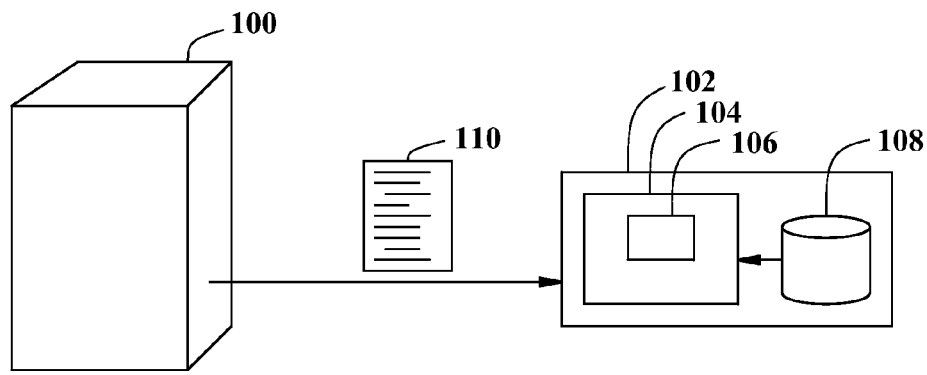
FIG. 1
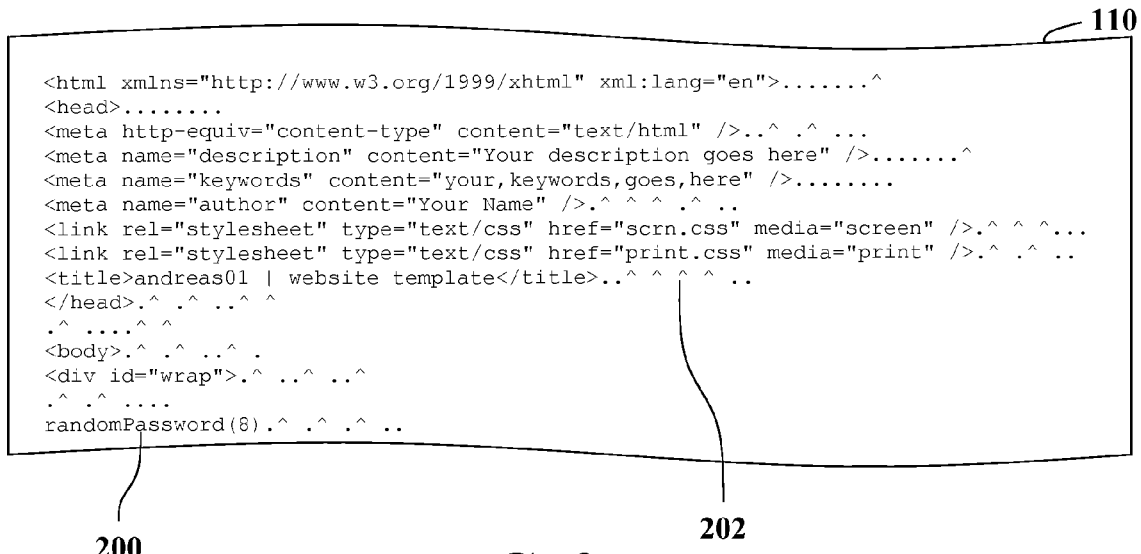
FIG. 2
```
<SCRIPT LANGUAGE="JavaScript">
function randomPassword(length)
{
  chars = "abcdefghijklmnopqrstuvwxyz1234567890";
  pass = "";
  for(x=0;x<length;x++)
  {
    i = Math.floor(Math.random() * 62);
    pass += chars.charAt(i);
  }
  return pass;
}
</script>
```
FIG. 3

COMPUTER SCRIPTING ENGINE TO EXTRACT AND EXECUTE STEGANOGRAPHICALLY HIDDEN SCRIPTS IN CARRIER SCRIPTS

BACKGROUND

Certain operations of computers may be controlled by computer scripts that are interpreted by scripting engines. The computer scripts may be written in a form that closely resembles a natural human language. The operations available through scripting may be at a high level, thus permitting complex operations of the computer to be expressed in a compact form.

The preparation of scripts can be relatively easy to do because of the close resemblance to natural human language. However, the expression in an easily read form of operations at a high level makes it easy for a recipient of the script to view the script, understand its operation and potentially modify the script.

It may be desirable at times to include operations in a computer script that the provider would prefer not to reveal to the recipient. This may be accomplished by encrypting a portion of the script so that it is no longer in a plain text, readable form. This may have the drawback of requiring a decryption process to run on the recipient computer that significantly slows down the processing of the script. As an alternative, the computer script may be obfuscated which obscures the readability of the script in a manner that may require little or no additional processing by the scripting engine to interpret the obfuscated script. It will be appreciated that an encrypted script or an obfuscated script can be restored to a readable form with varying amounts of effort on the part of a recipient.

SUMMARY

A scripting engine causes a computer to perform operations. The scripting engine includes a first script interpreter that executes a carrier script. A steganographic decoder extracts a hidden script that is steganographically coded in the carrier script. A second script interpreter executes the hidden script. The carrier script may include a graphic image file and the hidden script may be steganographically coded in the graphic image file. The scripting engine may further include a decryption module that decrypts the hidden script with a key that may be steganographically coded in a third script.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 1 is a block diagram of a system in which embodiments of the invention may operate.

FIG. 2 is a portion of an exemplary carrier script that embodies the invention.

FIG. 3 is an exemplary script that might be extracted from the carrier script of FIG. 2.

DETAILED DESCRIPTION

Figure 4:
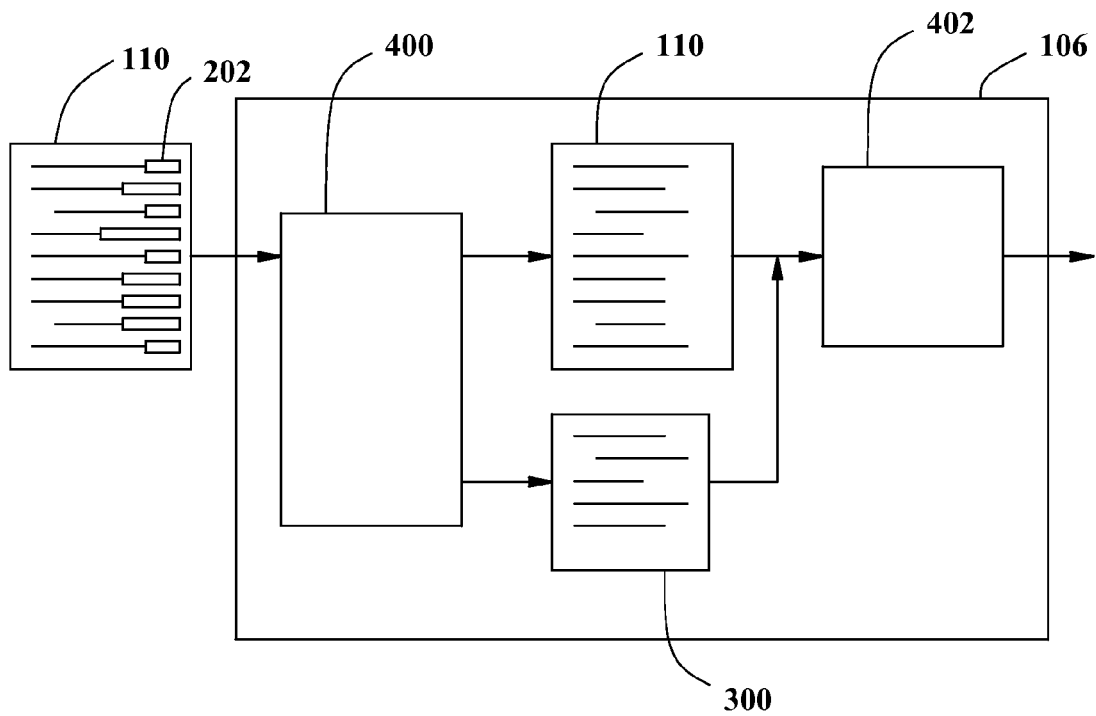
FIG. 4 is a block diagram illustrating an exemplary data flow for a scripting engine that embodies the invention.

FIG. 1 shows a computing environment in which the present invention may be used. A server 100 provides a computer script 110 to a user system 102 that includes a computer processor 104. The computer processor 104 may be coupled to a memory 108 that stores programs and data. The computer processor 104 executes a scripting engine 106 that receives the computer script 110 and interprets the script to generate sequences of instructions that are executed by the computer processor 104 to carry out the directives of the computer script. The present invention provides for delivery of a computer script 110 that includes a hidden script that is steganographically coded in the computer script, which may be termed a carrier script.

FIG. 2 shows an example of a portion of a carrier script 110 that embodies the invention. In this example, the carrier script 110 may include a hidden script 202 that is steganographically coded by appending space and tab characters, represented as "." and "^", to the end of the carrier script lines. It will be appreciated that the hidden script 202 will not be evident to the recipient if the carrier script is viewed with a typical script file viewer. This may provide a simple, yet reasonably effective way of hiding the hidden script. This method of steganographic coding is exemplary only, and the invention is not limited to any particular form of steganographic coding.

When the carrier script 110 is interpreted by a scripting engine 106 that embodies the present invention, the steganographically coded hidden script 202 will be detected, extracted and sent to a scripting engine to be interpreted. Hiding the script steganographically may have the advantage that it might not draw the attention of a recipient who might otherwise attempt to decrypt or deobfuscate a sensitive portion of the script.

FIG. 3 shows an example of a script 300 that might be extracted from the hidden script 202. The exemplary carrier script 110 is a hypertext mark-up language (HTML) script. It is shown as including the function "randomPassword(8)" 200 which is not defined in HTML. It will be seen that the exemplary extracted script 300 is a javascript script that defines the function randomPassword( ). If the extracted Javascript appeared in the clear carrier script 110, the scripting engine 106 would interpret the Javascript and define the function randompassword( ). The function would then be available for use by the HTML portion of the carrier script 110 at statement 200.

The present invention allows the function randompassword( ) to be defined while keeping the definition of the function from being readily apparent. As the scripting engine 106 interprets the script, it examines the script for the presence of a steganographically coded hidden script 202. If a hidden script 202 is detected, it is extracted and then executed in a similar manner to a script that is presented in the clear.

FIG. 4 shows a block diagram for a scripting engine 106 that embodies the invention. The scripting engine 106 receives a carrier script 110 that includes a steganographically coded hidden script 202. A steganographic decoder 400 extracts the hidden script 202 and provides the carrier script 110 and the extracted script 300 to a script interpreter 402. The script interpreter 402 sends instructions to the processor 104 (FIG. 1) that executing the scripting engine 106 to cause the processor to perform functions as directed by the carrier script 110 and the extracted script 300. While the carrier script 110 is shown without the hidden script 202 as it is forwarded to the script interpreter 402 by the steganographic decoder 400 to suggest that the hidden script has been extracted, it will be appreciated that it may not be necessary to remove the hidden script to allow the script interpreter to process the carrier script 110.

It will be appreciated that the capability of detecting, extracting, and executing steganographically coded hidden scripts may be added to any scripting engine and that once extracted hidden scripts may be processed by the scripting engine in the same manner as scripts that appear in the clear. A scripting engine with the capability of detecting, extracting, and executing steganographically coded hidden scripts may provide hidden scripts a different processing environment than that provided for scripts that appear in the clear. For example, hidden scripts may be permitted to use scripting languages or to access additional processor resources not available to scripts in the clear.

The carrier script may include more than one file. In one embodiment, the additional files may include one or more graphic image files with the hidden script steganographically coded in the image file. Image files can be particularly advantageous for steganographic coding of scripts because they can provide for comparatively lengthy coded scripts.

Figure 5:
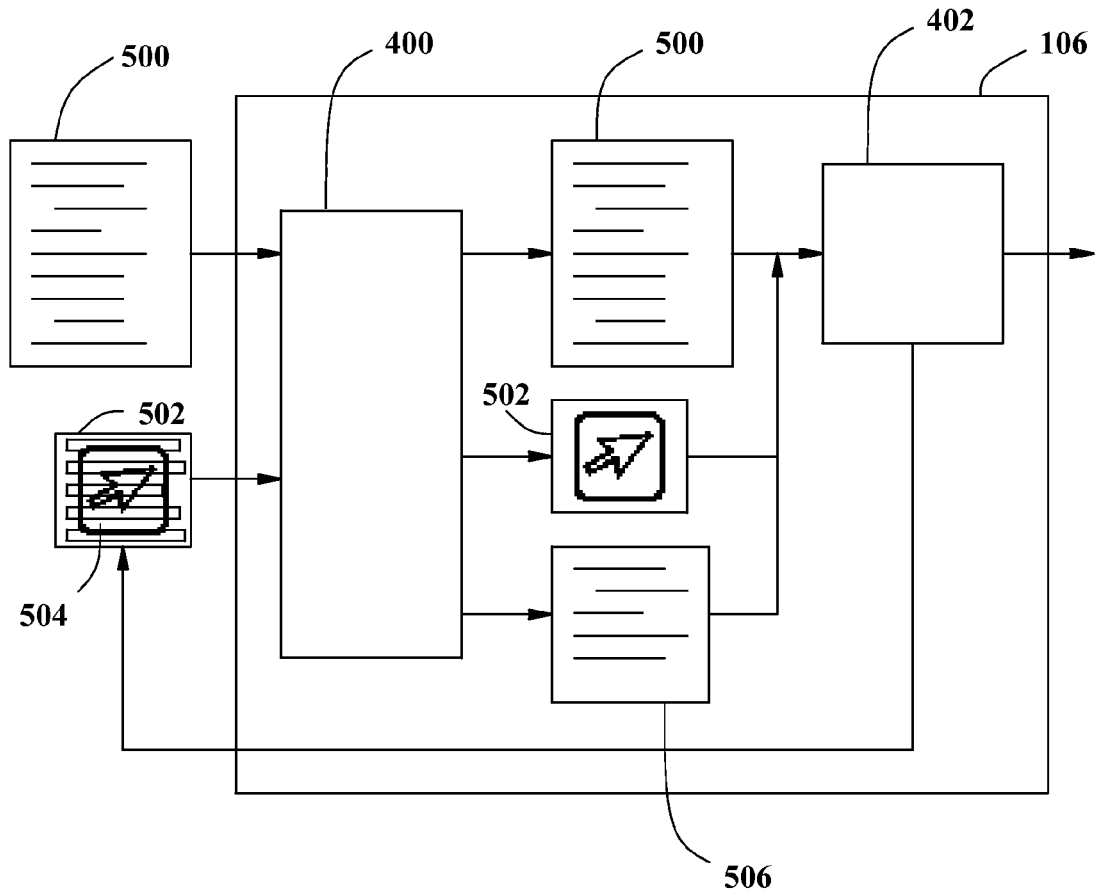
FIG. 5 is a block diagram illustrating another exemplary data flow for the scripting engine of FIG. 4.

FIG. 5 shows a block diagram for the scripting engine 106 as it may process a carrier script 500 that includes a graphic image file 502. The graphic image file may be included in the sense that there may be a statement in the carrier script 500 that directs the script interpreter 402 to retrieve the graphic image file for display. If the graphic image file 502 includes a steganographically coded hidden script 504, the steganographic decoder 400 extracts the hidden script and provides the graphic image 502 and the extracted script 506 to the script interpreter 406. While the graphic image 502 is shown without the hidden script 504 as it is forwarded to the script interpreter 402 by the steganographic decoder 400 to suggest that the hidden script has been extracted, it will be appreciated that it may not be necessary to remove the hidden script to allow the graphic image to be displayed.

In another embodiment of the invention, a key may also be steganographically coded into the carrier script. The key may be extracted by the steganographic decoder module 400 in the scripting engine 106 and the key may be used as part of the process of extracting the hidden script. In one embodiment of the invention, the hidden script is steganographically coded into the carrier script by identifying portions of the carrier script that form the hidden script in the key. Using the key, the appropriate portions of the carrier script are extracted to form the hidden script. This may be a particularly effective method for steganographically coding the hidden script when the hidden script and the carrier script use the same or similar scripting languages since there may be keywords and other texts strings that can be extracted to form the hidden string based on a compact representation in the key.

In another embodiment of the invention, the hidden script is also encoded and the extracted key is used to decrypt the hidden script after it is extracted from the carrier script. It will be appreciated that the key and the hidden script may be provided in different files and may be steganographically coded using different steganographic methods. For example the key might be provided in an HTML carrier script and the hidden script might be provided in a graphic image file.

In some embodiments of the invention, the hidden script may use a different scripting language than the carrier script while in other embodiments, both scripts may use the same scripting language. Examples of scripting languages with which the present invention may be used include hypertext mark-up language (HTML), Java script, extensible mark-up language (XML), or a programming language (APL). It will be appreciated that the present invention may be used with any scripting language that permits steganographic coding of the hidden script.

The hidden script may also be obfuscated prior to being hidden so that even if the user realizes that the carrier script includes a steganographically coded script and extracts it, the extracted script still will not present a readily understood scripting function.

Figure 6:
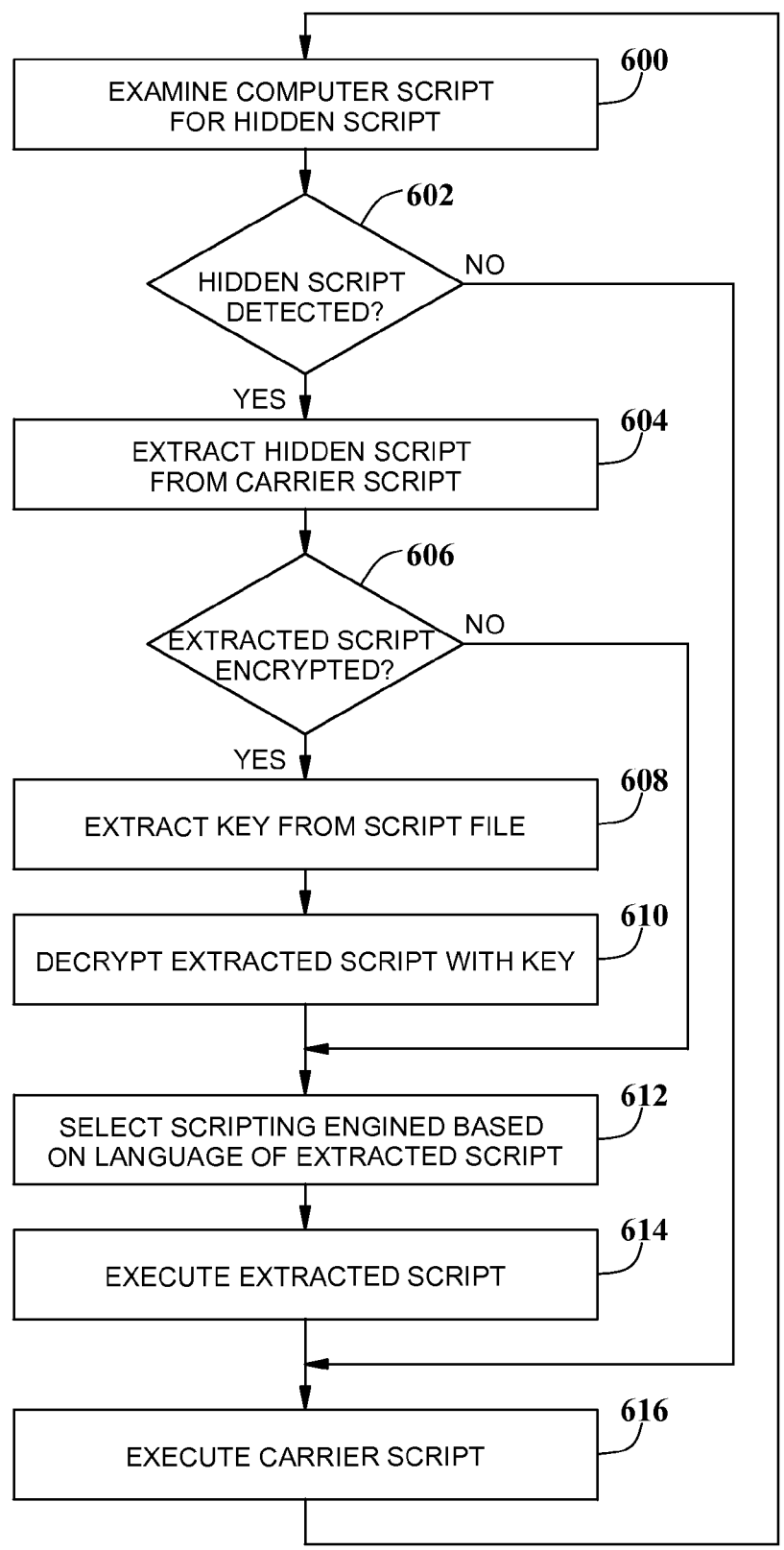
FIG. 6 is a flowchart of a method for processing computer scripts that embodies the invention.

FIG. 6 is a flowchart for a method of processing computer scripts according to the present invention. A scripting engine examines a computer script for the presence of a hidden script 600 as the script is executed. The computer script may include one or more files and the additional files may be retrieved in response to directives in the computer script. The additional files may include graphic image files. A hidden script may be present in any or all of the files included in the computer script and may span more than one file.

If a hidden script is detected 602-YES, the hidden script is extracted 604. The extracted script is examined to determine if it is encrypted. If the script is encrypted 606-YES, a steganographically hidden key is extracted from a script file 608 and the extracted script is decrypted 610. If the script is not encrypted 606-NO, the decryption process is bypassed.

The extracted script is examined to determine the scripting language 612. The extracted script is provided to a script interpreter to be executed 614 as determined by the scripting language of the extracted script. If the computer script does not contain a hidden script 602-NO the extraction process is bypassed. A scripting engine executes the computer script 616. The computer script and the extracted script may use the same or different scripting languages. The extracted script may be obfuscated. The computer script and the extracted script may be executed by the same script interpreter or by different script interpreters.

A computer script that embodies the invention may be embodied in a computer readable medium having a carrier script and a hidden script that is steganographically coded in the carrier script. The carrier script, when executed by a computer 104 (FIG. 1), causing the computer to extract and execute the hidden script. The term "computer readable medium" should be taken to include a single medium or multiple media (e.g., a centralized or distributed database, and/or associated caches and servers) that store the one or more sets of instructions. The term "computer readable medium" shall also be taken to include any medium that is capable of storing a set of instructions for execution by the computer and that cause the computer to perform any one or more of the methodologies of the present invention. The term "computer readable medium" shall accordingly be taken to include, but not be limited to, solid-state memories, optical media, and magnetic media. The term "article of manufacture comprising a computer readable medium" should be taken to include all forms of "computer readable medium" that are also patentable subject matter.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A scripting engine to cause a computer processor to perform operations, the scripting engine comprising:

a first script interpreter that causes the computer processor to interpret a carrier script that is presented in the clear to generate a first sequence of instructions that are executed by the computer processor to carry out the directives of the carrier script;

a first steganographic decoder that causes the computer processor to extract a hidden script that is steganographically coded in the carrier script, the hidden script being different from the carrier script; and a second script interpreter that causes the computer processor to interpret the hidden script to generate a second sequence of instructions that are executed by the computer processor to carry out the directives of the hidden script.

2. The scripting engine of claim 1 wherein the carrier script includes a plurality of files.

3. The scripting engine of claim 2 wherein the plurality of files includes a graphic image file and the steganographic decoder extracts the hidden script that is steganographically coded in the image file.

4. The scripting engine of claim 1 further comprising a second steganographic decoder that extracts a key that is steganographically coded in a third script, wherein the first steganographic decoder uses the key to extract the hidden script.

5. The scripting engine of claim 4 wherein the third script is the same as the carrier script.

6. The scripting engine of claim 4 further comprising a decryption module that decrypts the hidden script with the key.

7. The scripting engine of claim 1 wherein the carrier script is scripted in a first scripting language and the hidden script is scripted in a second scripting language that is different from the first scripting language.

8. The scripting engine of claim 7 wherein the first scripting language and the second scripting language are each one of HyperText Markup Language (HTML), JavaScript, eXtensible Markup Language (XML), or A Programming Language (APL).

9. The scripting engine of claim 7 wherein the second scripting language is obfuscated.

10. A method of processing computer scripts by a computer processor, the method comprising:

interpreting, by the computer processor, a carrier script that is presented in the clear to generate a first sequence of instructions that are executed by the computer processor to carry out the directives of the carrier script;

extracting, by the computer processor, a hidden script that is steganographically coded in the carrier script, the hidden script being different from the carrier script; and interpreting, by the computer processor, the hidden script to generate a second sequence of instructions that are executed by the computer processor to carry out the directives of the hidden script.

11. The method of claim 10 wherein the carrier script includes a plurality of files, at least one of the plurality of files being a graphic image file, and the hidden script is steganographically coded in the graphic image file.

12. The method of claim 10 further comprising extracting a key that is steganographically coded in a third script, wherein extracting the hidden script uses the key to extract the hidden script.

13. The method of claim 12 wherein extracting the hidden script includes decrypting the hidden script with the key.

14. The method of claim 10 wherein the carrier script is scripted in a first scripting language and the hidden script is scripted in a second scripting language that is different from the first scripting language.

15. The method of claim 14 wherein the second scripting language is obfuscated.

16. A scripting engine to cause a computer processor to perform operations, the scripting engine comprising:

means for interpreting a carrier script that is presented in the clear, by the computer processor, to generate a first sequence of instructions that are executed by the computer processor to carry out the directives of the carrier script;

means for extracting a hidden script that is steganographically coded in the carrier script, by the computer processor, the hidden script being different from the carrier script; and means for interpreting the hidden script, by the computer processor, to generate a second sequence of instructions that are executed by the computer processor to carry out the directives of the hidden script.

17. The scripting engine of claim 16 wherein the carrier script includes a plurality of files, at least one of the plurality of files being a graphic image file, and the hidden script is steganographically coded in the graphic image file.

18. The scripting engine of claim 16 further comprising means for extracting a key that is steganographically coded in a third script, wherein the means for extracting the hidden script uses the key to extract the hidden script.

19. The scripting engine of claim 18 wherein the means for extracting the hidden script includes means for decrypting the hidden script with the key.

20. The scripting engine of claim 16 wherein the carrier script is scripted in a first scripting language and the hidden script is scripted in a second scripting language that is different from the first scripting language.

21. The scripting engine of claim 20 wherein the second scripting language is obfuscated.

22. An article of manufacture comprising a computer readable non-transitory storage medium storing a carrier script that is presented in the clear and a hidden script that is steganographically coded in the carrier script, the hidden script being different from the carrier script, the carrier script, when interpreted by a computer processor, causing the computer processor to generate a first sequence of instructions that are executed by the computer processor to carry out the directives of the carrier script and to extract and interpret the hidden script to generate a second sequence of instructions that are executed by the computer processor to carry out the directives of the hidden script.

23. The article of manufacture of claim 22 wherein the carrier script includes a plurality of files, at least one of the plurality of files being a graphic image file, and the hidden script is steganographically coded in the graphic image file.

24. The article of manufacture of claim 22 wherein the carrier script, when executed by the computer processor, further causes the computer processor to extract a key that is steganographically coded in a third script, and to use the key to extract the hidden script.

25. The article of manufacture of claim 24 wherein the carrier script, when executed by the computer processor, further causes the computer processor to decrypt the hidden script with the key.

26. The article of manufacture of claim 22 wherein the carrier script is scripted in a first scripting language and the hidden script is scripted in a second scripting language that is different from the first scripting language.

27. The article of manufacture of claim 26 wherein the second scripting language is obfuscated.

* * * * *